(12) United States Patent
Winters

(10) Patent No.: US 10,751,847 B2
(45) Date of Patent: Aug. 25, 2020

(54) DRIVE UNIT

(71) Applicant: EHRT Maschinenbau GmbH, Rheinbreitbach (DE)

(72) Inventor: Andreas Winters, Solingen (DE)

(73) Assignee: EHRT Maschinenbau GmbH, Rheinbreitbach (DE)

( * ) Notice: Subject to any disclaimer, the term of this patent is extended or adjusted under 35 U.S.C. 154(b) by 368 days.

(21) Appl. No.: 15/247,306

(22) Filed: Aug. 25, 2016

(65) Prior Publication Data

US 2017/0057034 A1 Mar. 2, 2017

(30) Foreign Application Priority Data

Aug. 27, 2015 (DE) .......................... 10 2015 011 061
Feb. 23, 2016 (DE) .......................... 10 2016 002 056

(51) Int. Cl.
*B23Q 5/32* (2006.01)
*B23Q 5/10* (2006.01)
*B23Q 5/28* (2006.01)

(52) U.S. Cl.
CPC ............... *B23Q 5/326* (2013.01); *B23Q 5/10* (2013.01); *B23Q 5/28* (2013.01)

(58) Field of Classification Search
CPC . B23Q 5/28; B23Q 5/10; B23Q 5/326; B25D 11/00; B25D 2250/095
USPC .................................................. 173/160, 217
See application file for complete search history.

(56) References Cited

U.S. PATENT DOCUMENTS

| | | | | |
|---|---|---|---|---|
| 3,599,857 A * | 8/1971 | Loyd | ...................... | B23K 20/12 228/2.3 |
| 3,871,138 A * | 3/1975 | Welsch | .................... | B24B 23/02 279/46.2 |
| 4,007,795 A * | 2/1977 | Gawron | ................ | B25B 21/007 173/50 |
| 4,252,360 A * | 2/1981 | Gallaher, Jr. | .......... | B25J 9/0084 294/106 |
| 4,934,040 A * | 6/1990 | Turchan | ................... | B23G 1/32 29/566 |
| 5,016,335 A * | 5/1991 | Becker | ................... | B23G 3/005 29/57 |
| 5,078,558 A * | 1/1992 | Arai | ...................... | B23B 31/207 384/107 |

(Continued)

FOREIGN PATENT DOCUMENTS

DE 3128228 5/1982
DE 3834140 4/1990

(Continued)

OTHER PUBLICATIONS

European search opinion EP 16001847 dated Jan. 18, 2017.
Annex to the Communication from the Examining Division EP 16001847 dated Sep. 10, 2018.

*Primary Examiner* — Robert F Long
(74) *Attorney, Agent, or Firm* — Mark David Torche; Patwrite Law

(57) ABSTRACT

A drive unit with a spindle drive and a spindle-drive drive motor, which comprises a rotor, is characterized in that a spindle of the spindle drive is arranged inside the rotor acting as a spindle nut and comprising a hollow shaft. As a result, a particularly compact construction for the drive unit can be realized, which can serve, in particular, as a linear drive of tool sleeve.

9 Claims, 1 Drawing Sheet

(56) References Cited

U.S. PATENT DOCUMENTS

| | | | | |
|---|---|---|---|---|
| 5,100,271 A * | 3/1992 | Kameyama | ............ | B23Q 5/402 408/129 |
| 5,184,053 A * | 2/1993 | Maruo | ................ | G05B 19/186 318/39 |
| 5,226,762 A * | 7/1993 | Ecker | ................ | B23B 51/0473 408/204 |
| 5,295,407 A * | 3/1994 | Hirose | ................ | F16H 25/2223 74/89.37 |
| 5,513,709 A * | 5/1996 | Fisher | .................... | B25D 11/08 173/170 |
| 5,658,102 A * | 8/1997 | Gale | .................. | B23B 51/0426 408/1 R |
| 5,685,214 A * | 11/1997 | Neff | .................... | B23Q 1/4876 310/12.13 |
| 7,175,372 B2 * | 2/2007 | Davis | ................ | B23B 31/4073 408/204 |
| 8,857,536 B2 * | 10/2014 | Brennenstuhl | ............ | B25F 5/02 173/104 |
| 9,421,694 B2 * | 8/2016 | Keightley | ........... | B23B 51/0426 |
| 2003/0200640 A1 * | 10/2003 | Bifrare | .................... | G04D 3/04 29/231 |
| 2006/0156844 A1 * | 7/2006 | Yamashita | .......... | F16H 25/2214 74/424.86 |
| 2011/0147029 A1 * | 6/2011 | Roehm | ................. | B25B 23/141 173/176 |
| 2013/0161043 A1 * | 6/2013 | Blum | ................... | B25D 11/104 173/48 |
| 2014/0290973 A1 * | 10/2014 | Lin | ........................ | B25F 5/02 173/104 |
| 2014/0301800 A1 * | 10/2014 | Bernhard | ................ | B23Q 11/127 409/135 |
| 2016/0199970 A1 * | 7/2016 | McGougan | ............ | B25B 21/00 173/216 |

FOREIGN PATENT DOCUMENTS

| | | |
|---|---|---|
| DE | 4341166 | 6/1994 |
| DE | 19858667 | 6/1999 |
| DE | 112008000864 T5 | 2/2010 |
| WO | 1999/10965 | 3/1999 |
| WO | 03/080316 | 10/2003 |
| WO | 2007113045 | 10/2007 |
| WO | 2008138505 | 11/2008 |

* cited by examiner

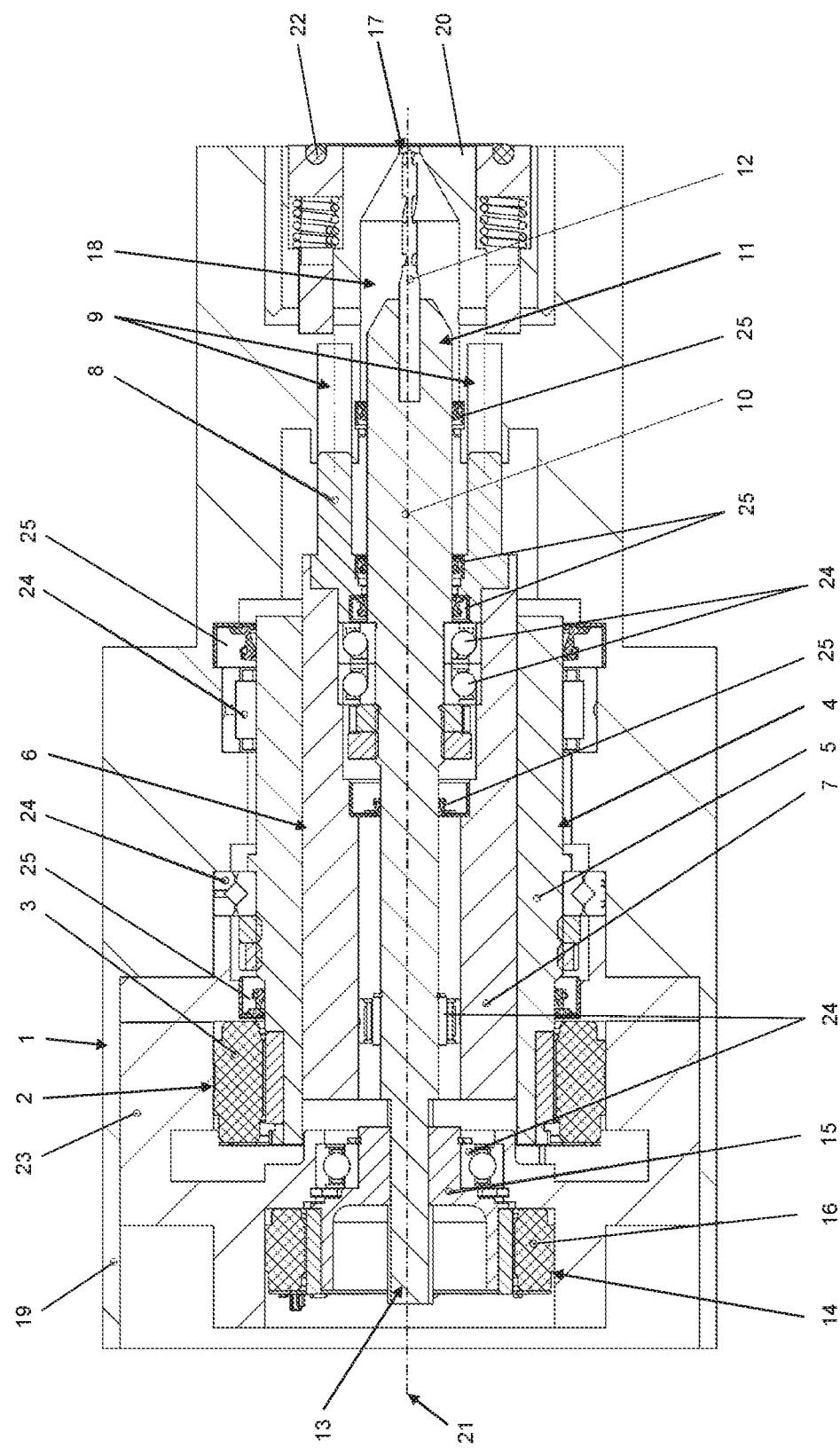

DRIVE UNIT

CROSS REFERENCE TO RELATED APPLICATIONS

This application claims priority under the Paris Convention on DE Patent Application Number 1020160020563 filed on Feb. 23, 2016 and DE Patent Application Number DE 1 0201 501 10616 filed on Aug. 27, 2015, the entire content of each are herein incorporated by reference.

FIELD OF THE INVENTION OF THE INVENTION

The invention relates to a drive unit with a spindle drive and a spindle-drive drive motor. The invention relates further to the use of such a drive unit for a tool sleeve and, in particular, a drilling sleeve.

BACKGROUND OF THE INVENTION

Linear drives in drilling sleeves, with which the linear feed motion of the drilling tools is realized, are generally embodied by means of combinations of toothed rack and pinion driven by electric motor. Such drilling sleeves have the disadvantage of relatively large external dimensions. Alternatively, hydraulic or pneumatic linear drives for drilling sleeves are also known, which are, however, relatively effort-intensive as a result of the necessary provision of a hydraulic or pneumatic energy source, and also in design terms.

SUMMARY OF THE INVENTION

Starting from this prior art, the invention was based on the object of specifying a linear drive for a drilling sleeve which is as compact as possible. This object is achieved by a drive unit according to claim 1. Advantageous embodiments of the drive unit according to the invention form subject matter of the other claims and are derived from the following description of the invention.

In the case of a drive unit with a spindle drive and a (preferably electrical) spindle-drive drive motor, in which the spindle-drive drive motor comprises a stator and a rotor, it is provided according to the invention that a spindle of the spindle drive is arranged (at least partially) inside the rotor acting as a spindle nut and comprising a hollow shaft (or preferably also completely constituted as a hollow shaft). As a result of the at least partial arrangement of the spindle of the spindle drive inside the rotor of the spindle-drive drive motor acting as a spindle nut and comprising a hollow shaft, the drive unit can be embodied in a particularly compact manner.

For an advantageous and, in particular, as far as possible, backlash-free and low-friction transformation of the rotary driving movement of the rotor of the spindle-drive drive motor into a linear movement of the spindle, it can preferably be provided that the spindle drive is constituted as a ball-screw drive or as a roller-screw drive, and, in particular, as a planetary roller-screw drive.

In order to prevent a rotation of the axially movable spindle together with the rotor of the spindle-drive drive motor, it can advantageously be provided that the spindle is guided in a anti-twist manner (about its longitudinal axis or respectively movement axis) in a housing of the drive unit.

In one preferred embodiment of the drive unit according to the invention, the latter can be advantageously further developed as a tool sleeve. For this purpose, the latter can comprise a tool spindle mounted in a rotatable and at the same time axially fixed manner (that is, immovable or movable within defined limits (but smaller than the maximal linear stroke of the spindle drive)) inside the spindle comprising a hollow shaft (or preferably constituted completely as a hollow shaft). The tool spindle can preferably be further provided at one end with a tool-retaining head for retaining an arbitrary tool. With such an embodiment of the drive unit according to the invention, the latter constitutes a particularly compact tool sleeve.

A preferred application according to the invention of such a tool sleeve is found in the use as a drilling sleeve, for which purpose the tool spindle comprises a tool-retaining head for a drilling tool at the end. Accordingly, the invention also comprises a combination of such a drive unit constituted as a tool sleeve and, in particular, a drilling sleeve, with at least one tool, in particular, a drilling tool, preferably a (drilling-) tool set with a plurality of different (drilling-) tools, which, however, comprise identical attachment interfaces for connection with the tool-retaining head of the drive unit.

For a rotating drive of the tool spindle, a (preferably electrical) tool-spindle drive motor, preferably different from the spindle-drive drive motor, can be provided. However, applications in which the tool spindle can be driven in a similar manner by the spindle-drive drive motor with the optional, intermediate connection of a speed-transforming transmission and/or a coupling are also conceivable.

In turn, for the most compact embodiment possible of the drive unit according to the invention, it can be provided that the tool-spindle drive motor comprises a stator and rotor comprising a hollow shaft or constituted as a hollow shaft, wherein a coupling portion of the tool spindle is retained in a rotationally rigid and axially displaceable manner within the rotor of the tool-spindle drive motor.

In one preferred embodiment of the drive unit according to the invention and therefore also of the combination according to the invention, it can be provided that the spindle-drive drive motor and/or the tool-spindle drive motor is/are constituted as a servomotor. Accordingly, the respective drive motor is constituted in such a manner that, through the integration of at least one sensor and the evaluability of the measured values of this sensor in an evaluation unit, it allows a control of at least the angular position of the rotor, and derived from this, preferably also of the rotational speed and/or the angular acceleration. In this context, a control for the angular position and/or for one or more parameters derived from the angular position can be provided by further preference.

One embodiment which is advantageous for the assembly and/or maintenance of the drive unit according to the invention can provide that the housing comprises a first housing part, which forms an internal volume, wherein a second housing part, to which the spindle-drive drive motor and/or the tool-spindle drive motor is attached in a rotationally rigid manner, is arranged at least partially inside the internal volume of the first housing part in a rotationally rigid and axially fixed manner (immovable or movable within defined limits (but smaller than the maximal linear stroke of the spindle drive)).

The indefinite articles ("a" and "an") should be understood as such and not as numerals, especially in the claims and in the description explaining the claims in general. Correspondingly specified components should therefore be understood in the sense that these are present at least once and can be present multiple times.

BRIEF DESCRIPTION OF THE DRAWINGS

The invention is explained in greater detail on the basis of an exemplary embodiment presented in the drawings. The drawings show:

FIG. 1 a drive unit according to the invention in a simplified view.

DETAILED DESCRIPTION OF THE INVENTION

The drive unit illustrated in the drawings comprises a multi-part housing 1, within which a spindle drive and an electric spindle-drive drive motor 2 is arranged as a servomotor. The spindle-drive drive motor 2 comprises a stator 3 retained both in a rotationally rigid manner and also in an axially immovable manner within the housing 1 and a rotor 4 mounted in a rotatable manner inside the stator 3. The spindle-drive drive motor 2 is accordingly embodied as a so-called internal rotor. The rotor 4 comprises a hollow shaft 5, of which the length (extension in longitudinal-axial direction) is significantly greater than the length of the stator 3. The hollow shaft 5 is therefore additionally mounted inside the housing in a rotatable manner via roller bearings 24. Sealing elements in the form of radial-shaft sealing rings 25 seal this rotary bearing off from the environment here. The hollow shaft 5 serves as a spindle nut of the spindle drive constituted as a ball-screw drive. For this purpose, one or more ball bearings (not illustrated) are borne in a known manner in the hollow shaft 5, which roll in a spiral groove (not illustrated) of a spindle 6 of the spindle drive, wherein, dependent upon the pitch of the spiral groove, a rotary movement of the hollow shaft 5 or respectively of the rotor 4 of the spindle-drive drive motor 2 is transformed into a linear movement of the spindle 6. In this context, in order to ensure that the rotary movement of the rotor 4 is transformed exclusively into a linear movement of the spindle 6, the latter comprises an anti-twist device, which comprises several guide pins 8 connected at one longitudinal-axial end to a main spindle body 7, which are guided in an axially movable manner in complementary guide openings 9 of the housing 1. The guiding of the guide pins 8 in the guide openings 9 is accordingly sealed via sealing elements in the form of radial-shaft sealing rings 25.

The spindle 6 (or respectively the main spindle body 7) of the spindle drive is similarly constituted as a hollow shaft. Inside the spindle 6, a tool spindle 10, which forms a tool-retaining head 11 at one longitudinal-axial end, is mounted in a rotatable manner via roller bearings 24. This rotary bearing is also sealed off from the environment by means of sealing elements in the form of radial-shaft sealing rings 25. In the present exemplary embodiment, the tool-retaining head 11 is provided for retaining a drilling tool 12. The tool spindle 10 projects from the spindle 6 of the spindle drive at the distal end with reference to the tool-retaining head 11, with the tool-retaining head 11 and also with a coupling portion 13. This coupling portion 13 of the tool spindle 10, which can comprise a non-round and, for example, rectangular, pentagonal or hexagonal cross-section, is mounted in a longitudinally-axially movable, and at the same time anti-twist manner, inside a rotor 15 of an (electrical) tool-spindle drive motor 14 similarly constituted as a servomotor. Alongside the rotor 15, this tool-spindle drive motor 14 also comprises a stator 16, which is mounted in a rotationally rigid and axially immovable manner inside the housing 1. The rotor 15 of the tool-spindle drive motor 14 projects with one portion beyond the stator 16 and is mounted within the housing in a rotatable manner in this portion via a roller bearing 24.

In the case of an activation of the tool-spindle drive motor 14, the tool spindle 10 and accordingly the drilling tool 12 are driven rotationally. Independently of this rotational drive of the tool spindle 10 or respectively of the drilling tool 12, a feed motion for the tool spindle 10 and therefore for the drilling tool 12 can be adjusted through a corresponding activation of the spindle-drive drive motor 2. The relative movement resulting from the feed motion of the tool spindle 10 in combination with the stationary arrangement of the tool-spindle drive motor 14 within the housing 1 is made possible in this context by the longitudinal-axial mobility of the coupling portion 13 of the tool spindle 10 inside the rotor 15 of the tool-spindle drive motor 14 similarly constituted as a hollow shaft.

FIG. 1 shows the tool spindle 10 in the most extreme retracted position possible, which corresponds to the end positions of the spindle drive. The drilling tool 12 retained in the tool-retaining head 11 of the tool spindle 10 is retained entirely, in this context, inside the housing 1 of the drive unit. In the case of an activation of the spindle-drive drive motor 2, the tool spindle 10 including the drilling tool 12 is displaced in a linear manner (to the right in FIG. 1), wherein a tool portion of the drilling tool 12 is guided outwards by a greater or lesser distance through a tool opening 17 of the housing 1. By contrast, the tool spindle 10 then also remains completely retained inside the housing 1 when the maximal linear stroke for the spindle drive has been reached. For this purpose, a correspondingly dimensioned feed-motion space 18 is provided in the housing 1.

The feed-motion space 18 is constituted at least partially inside a head part 20 of the housing 1, mounted to allow linear movement and tilting within limits inside a main part 19 of the housing 1. The exterior front end of this head part 20 serves primarily for the contact with the work piece to be processed (not illustrated), wherein a not-exactly-rectangular alignment of the contact surface of the work piece to be processed relative to the longitudinal axis 21 of the drive unit (which corresponds to the axes of rotation of the rotors 4, 15 of the two drive motors 2, 14 and the tool spindle 10) can be compensated. Through the integration of a circumferential sealing ring 22 in the exterior front end of the head part 20, the processing position of the work piece to be processed can be further sealed off from the environment.

For an advantageous assembly and maintenance of the drive unit, it is provided that the main part 19 of the housing 1 constitutes an internal volume, which is (also) constituted to be open at the front end which is disposed distally with reference to the head part 20. Via the opening in this front end, an insert part 23 of the housing 1 can be inserted into the internal volume and can be fixed there, for example, via one or more screw connections, both in a rotationally rigid and also an axially immovable manner. Both the spindle-drive drive motor 2 and also the tool-spindle drive motor 14 is attached (in each case via the rotors 4, 15) to the insert part 23. This allows the two drive motors 2, 14, including the spindle 6 connected to the spindle-drive drive motor 2 and the tool spindle 10 connected to the tool-spindle drive motor 2, to be inserted into the main part 19 of the housing 1 and removed from the latter as a unit.

LIST OF REFERENCE NUMBERS

1 Housing
2 Spindle-drive drive motor

3 Stator of the spindle-drive drive motor
4 Rotor of the spindle-drive drive motor
5 Hollow shaft of the rotor of the spindle-drive drive motor
6 Spindle
7 Main spindle body
8 Guide pin
9 Guide opening
10 Tool spindle
11 Tool-retaining head
12 Drilling tool
13 Coupling portion of the tool spindle
14 Tool-spindle drive motor
15 Rotor of the tool-spindle drive motor
16 Stator of the tool-spindle drive motor
17 Tool opening of the housing
18 Feed-motion space
19 Main part of the housing
20 Head part of the housing
21 Longitudinal axis of the drive unit
22 Sealing ring
23 Insert part of the housing
24 Roller bearing
25 Radial-shaft sealing ring

What is claimed is:

1. A drive unit comprises a spindle drive and a spindle-drive drive motor, wherein the spindle-drive drive motor comprises a rotor, wherein a spindle of the spindle drive is arranged inside the rotor acting as a spindle nut and comprising a hollow shaft, and wherein the spindle is guided in an anti-twist manner in a housing of the drive unit, and wherein the spindle provides an anti-twist device comprising several guide pins connected at one longitudinal-axial end to a main spindle body, which are guided in an axially movable manner in complementary guide openings of the housing; wherein the spindle comprises at least one structural element, configured to interact with the spindle nut, so as to transform a rotary motion of the spindle nut into a linear movement of the spindle.

2. The drive unit according to claim 1, wherein the spindle drive is constituted as a ball-screw drive or as a roller-screw drive.

3. The drive unit according to claim 1, wherein inside the spindle comprising a hollow shaft, a tool spindle is mounted in a rotatable and axially fixed manner.

4. The drive unit according to claim 3, wherein at the end, the tool spindle comprises a tool-retaining head for a drilling tool.

5. The drive unit according to claim 1, further comprising a tool-spindle drive motor.

6. The drive unit according to claim 5, wherein the tool-spindle drive motor comprises a rotor comprising a hollow shaft, wherein a coupling portion of the tool spindle is retained in a rotationally rigid and axially displaceable manner inside the rotor of the tool-spindle drive motor.

7. The drive unit according to claim 5, wherein the spindle-drive drive motor and/or the tool-spindle drive motor is constituted as a servomotor.

8. The drive unit according to claim 1, wherein the housing comprises a first housing part, which constitutes an internal volume, wherein a second housing part, to which the spindle-drive drive motor is attached in a rotationally rigid manner, is arranged inside the internal volume of the first housing part in a rotationally rigid and axially fixed manner.

9. The drive unit according to claim 1, further comprising a tool-spindle drive motor, wherein the housing comprises a first housing part, which constitutes an internal volume, wherein a second housing part, to which the tool-spindle drive motor is attached in a rotationally rigid manner, is arranged inside the internal volume of the first housing part in a rotationally rigid and axially fixed manner.

* * * * *